Sept. 18, 1962 C. J. BENEKE 3,054,176
FORMING SYSTEM
Filed July 6, 1959
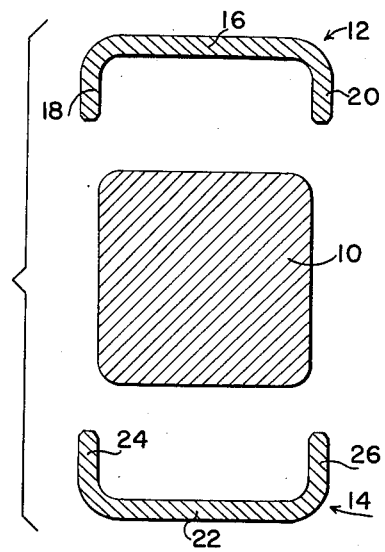
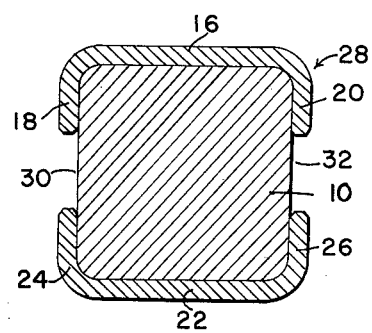
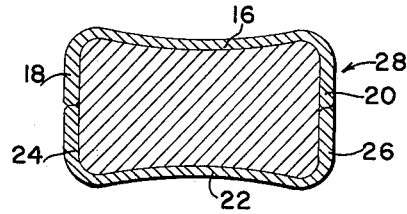
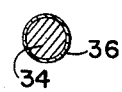
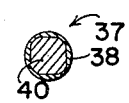
INVENTOR
CHARLES J. BENEKE
by his attorneys
Glenn and Jackson United States Patent Office 3,054,176
Patented Sept. 18, 1962

3,054,176
FORMING SYSTEM
Charles J. Beneke, Henrico County, Va., assignor to Reynolds Metals Company, Richmond, Va., a corporation of Delaware
Filed July 6, 1959, Ser. No. 825,025
11 Claims. (Cl. 29—528)

This invention relates to a method of producing composite metal wire having a core of one metal or alloy and a cladding surrounding the core. More particularly, this invention relates to a method of producing clad aluminum screen wire.

In the manufacture of aluminum screen wire it is necessary to provide a composite body having a high strength alloy core for mechanical strength and rigidity and a corrosion-resistant substantially-pure aluminum cladding for protection from the deleterious effects of atmospheric exposure such as corrosion.

Heretofore, various methods have been used and other methods have been proposed for manufacturing the clad rod from which the screen wire is drawn. In one known method, an ingot of the strong core alloy with a 12-inch square cross-section is continuously cast by conventional methods. The ingot is scalped to about a 10-inch square cross-section. The scalped billet is heated and centered inside a conventional mold and held in place by spiders while the corrosion resistant aluminum alloy cladding is cast around it in a continuous casting operation.

The resulting composite is heated to rolling temperature (about 800° F.) and rolled down to a 6-inch square cross-section, which in turn is rolled down to ⅜-inch diameter round rod stock by conventional rolling methods. About 36 passes through large rolling equipment adapted to the handling of the massive 12-inch square composite are required to reduce the initial composite to rod.

In another method a 12-inch square cross-section ingot of the strong core alloy is continuously cast and homogenized. After reheating to rolling temperature, the ingot is reduced to a six-inch square cross-section by conventional rolling with about 12 passes and then scalped. Next, a sheet of corrosion resistant aluminum alloy is prepared by conventional casting and rolling and is press-brake formed into channel sections which are fitted around the core member.

Alternatively, extruded channel sections are used in place of rolled and formed sheet for the cladding members. The channel sections are united with the core billet. The composite billet so formed is about 6 inches square and is heated to rolling temperature and then reduced to ⅜-inch diameter circular rod by conventional rolling. About 22 passes through rod rolling equipment are required to reduce the composite 6-inch square billet to a ⅜-inch diameter composite rod. Both methods require scalping which adds to the manufacturing cost because scalping necessitates additional material handling, machining, and scrap segregation and remelting. Also, some metal is invariably lost in the remelting operation.

In both these methods the object is to provide a core having a substantially uniformly worked structure. Because the worked structure is obtained by rolling, it is necessary to start with massive ingots and take large reductions in order to provide the necessary work. Although these methods are highly successful in producing a worked core structure, manufacture by these methods requires large capital investment in casting, rolling, machining, and materials handling equipment which these processes require. The market is insufficient to justify such large capital investment by a manufacturer whose sole product is aluminum screen wire. In addition to the economic limitations of these methods there are product quality limitations in these methods of cladding a massive core section. The core and cladding frequently become non-concentric during the many roll passes required for reduction to rod stock. The core frequently develops an undulating surface comprising re-entrant curves referred to in the art as "clover leaf," because the core stock has the appearance of a four-leaf clover. This "clover leaf" condition can be a serious defect and is believed to be caused by the cladding and core deforming non-uniformly when the clad billet is rolled down to a circular cross-section so that the cladding is made round while the core retains part of its original angular shape with its corners forming projections or irregularities extending into the cladding. The tendency to form "clover leaf" is increased when a greater number of shaping roll passes is required to reduce the billet to rod preliminary to drawing of the rod into wire.

Non-concentricity and "clover leaf" of the core result in variations in resistance to bending in different directions. This circumferential variation in mechanical properties can cause "fly-back," which is a serious weaving defect resulting in non-uniformity in the spacing of filler wires in screening.

The present invention provides a simple and novel method of cladding by hot rolling one metal or alloy onto another metal or alloy without resorting to casting a composite ingot, or welding, clamping, bending, or threading one element into another prior to hot rolling.

The invention further provides a process for the economical manufacture of quality clad rod of circular cross-section with substantially complete absence of clover-leaf. Once the rod has been properly rolled down, the subsequent drawing operation has no adverse effect on the cross-sectional shape and position of the core.

Moreover, the invention provides a method for the economical manufacture of a rod of high-purity corrosion-resistant aluminum clad on a core of strong aluminum alloy suitable for drawing into wire that can be subsequently woven into wire screen. The method of the invention requires relatively low-cost and simple equipment which can be installed adjacent to or in connection with an existing operation. The method of the invention is economically suitable for small or medium volume manufacture of woven screening.

The invention contemplates an improved clad rod production method comprising the forming, as by extrusion, of a core member of substantially-square cross-section and two identical U-shaped channel members, snap-fitting the channel members around the core member in such manner so as to leave slight gaps between the opposed ends of the legs of the channel members. The assembly is heated and hot rolled to force the channel members against the square core member to close said gaps between the legs of the channel members and metallurgically bond the bases of the channel members to the core. Then the partly bonded composite is subjected to rolling on an axis perpendicular to the initial axis of rolling to bond the legs of the channel members to the core. Thereafter, the bonded composite is subjected to a limited number of shaping roll passes sufficient to reduce the composite to a rod of circular cross-section.

The thus-formed clad rod is then ready to be drawn down in conventional manner to wire that can be woven into wire screen.

Because the method of the invention can include extruding both the core and channel members, the core and channel members are of sufficiently small cross section at the commencement of the uniting operations that thorough bonding of the cladding to the core can be achieved with a minimum of subsequent shaping passes through the rolls. Because of the minimum number of shaping roll passes, the core and cladding deform substantially uniformly, with substantially no malformation of the core to the undulated or clover-leaf form, as the composite is reduced to circular cross-section.

A further advantage of the process of the invention is that by extruding both the core and the channel members, the size and dimensions of the core and channel members can be made within sufficiently close tolerances that the surfaces of the channel members mate with and engage the surface of the core. Thereby, when the assembled composite is rolled, the surfaces of the channel members uniformly engage the surface of the core so that thorough bonding promptly occurs over the full area of engagement of the channel members with the core.

Also, the process of this invention commences with ingots cast according to modern practice, so that it is unnecessary to scalp the ingots and waste of metal from scalping is eliminated. Wastage of metal is further minimized because both core and cladding channel members can be extruded directly to the dimensions required for accurate assembly of the composite.

With a drawable clad rod prepared according to the process of the invention, a superior screen wire, having a concentric uniform cladding about a circular core which is substantially free of evidence of cloverleaf, can be economically produced by conventional drawing methods. The screen wire so produced possesses a singular freedom from tendency to kink or bend and has uniform physical properties in all directions radial to the core axis making it ideally suitable for weaving and further processing.

For a better understanding of the invention and its other objects, advantages and details, reference is now made to the present preferred embodiment of the invention which is shown, for purposes of illustration only, in the accompanying drawings.

In the drawings:

FIG. 1 is a vertical section of an extruded core and two cladding channel members after extrusion;

FIG. 2 is a vertical section through a composite formed by uniting the channel members and the core shown in FIG. 1;

FIG. 3 is a vertical section through the composite rod shown in FIG. 2 after a first hot-roll pass that brings the legs of the channel members together;

FIG. 4 is a vertical section through an ideal round clad rod sought by the art; and FIG. 5 is a vertical section through a round composite rod according to the invention produced by subjecting the composite rod of FIG. 3 to a plurality of roll passes.

Referring to the drawings, according to the method of invention, a billet of high-strength aluminum alloy is extruded to form the core member 10 having a substantially-square cross section but with rounded corners. A billet of corrosion resistant aluminum alloy is extruded to form the two mating U-shaped channel members 12 and 14. Channel member 12 includes a base 16 and opposite legs 18 and 20. Similarly, channel member 14 includes a base 22 and opposite legs 24 and 26.

The channel members 12 and 14 have a snap fit on core member 10. The distance between the inner surfaces of legs 18 and 20 is about equal to the width of square core member 10, and the distance between the inner surfaces of legs 24 and 26 is about equal to the width of square core member 10, the exact dimensions being adjusted to give the desired snap fit.

The U-shaped channel members 12 and 14 are snap-fitted onto square core member 10 to form the composite rod shown in FIG. 2 and indicated by the numeral 28. A gap 30 separates the leg 18 from the leg 14. Also, a gap 32 separates the leg 20 from the leg 26.

In order to close the gaps 30 and 32 and to bond the channel members 12 and 14 to the core member 10, the composite rod 28 is heated to hot-rolling temperature and then passed through rolls wherein rolls engage the bases 16 and 22 of the channel members 12 and 14 to compress the composite rod to the shape shown in FIG. 3. By this hot-rolling pass, the opposed legs of the channel members 12 and 14 are brought into touching engagement, thus eliminating the gaps 30 and 32. Further, this hot-rolling pass firmly bonds the bases 16 and 22 to the core member 10.

Next, the composite rod 28, having the shape of FIG. 3, is rotated 90 degrees and then, still heated to hot-rolling temperature, passed through rolls that engage the outer surfaces of the legs 18, 20, 24 and 26. This pass firmly bonds the legs of the channel members to the core member 10.

The composite rod 28, having a substantially rectangular shape, is then subjected to a series of conventional roll passes wherein different portions of the surface of the composite rod are alternately and successively engaged by the rolls to diminish the cross section and convert the core to a substantially-circular cross section.

The ideal composite rod, suitable for drawing into screen wire, is pictured in FIG. 4. The art has been striving to produce such a rod, which has a perfectly-circular core 34 and a concentric perfectly-circular cladding 36 bonded thereto.

By successive rolling of the composite rod 28 shown in FIG. 3, the method of the invention produces the reduced composite rod 37 shown in FIG. 5, which approaches the ideal of FIG. 4. The composite rod of FIG. 5 includes a cladding 38 having a substantially-circular outer surface, and a core 40 that is substantially-concentric with the cladding 38. The core 40 has an outer surface that is substantially-circular but which has some residual flat portions remaining from the square core 10 from which it was formed. This composite rod is then drawn to reduce its diameter to form screen wire. The screen wire is then woven into wire screen.

One of the most useful applications of the invention is in production of screening wire having a core of strong aluminum alloy, and a cladding of relatively high-purity aluminum alloy for protection of the core against corrosion. The production of such wire is described more particularly in the following illustrative example of the method of the invention.

In the following example aluminum alloy numbers refer to the Aluminum Association Alloy Designations for wrought aluminum alloys. Alloy 5056 designates high-strength alloy of aluminum and magnesium. Alloy 6253 is a corrosion-resistant alloy of aluminum, zinc and magnesium.

An 8-inch diameter continuously-cast ingot of 5056 alloy was homogenized and then cut into lengths calculated to yield one or more 16-foot long extrusions from each length. The ingot segment or "log" was heated to extrusion temperature (about 800° F.) and extruded through a single or multiple hole die to form a core having a 1 11/16-inch square cross-section and having rounded corners.

A log of 6253 alloy was similarly prepared and extruded through a multi-port die to produce identical U-shaped channel members that were 16-feet long with 5/32-inch web thickness and having rounded corners and outside dimensional leg length of 3/4-inch separated by a base suitable for snap-fitting the legs against the core. The two channel members were snap-fitted around the square section core member.

The resulting composite was heated in a reheating furnace to about 800° F. The hot assembly was passed through grooved forming rolls in a rolling mill, bonding the channel members to the core member and compressing the composite so as to bring the opposed mating surfaces of the channel legs into close contact. After the initial pass, the partially bonded composite was rotated 90 degrees and then passed through a second pass through grooved rolls thus bonding the channel leg members to the core and compressing the composite to form a substantially square cross-section measuring about 1½ inch on each side.

The bonded composite was subjected to rolling through more passes through grooved rolls, the openings in each successive pass being progressively smaller than the preceding one and with a 90° change in the axis of the composite being made between each pass through the mill. 12 of these compacting passes served to weld the entire mass together while reducing its size to the desired ⅜-inch diameter rod that comes through the last roll pass.

Examination of the clad rod at this stage showed that the core and cladding were substantially-concentric, the cladding layer was metallurgically bonded to the core, the cladding layer had uniform thickness, both core and cladding were uniformly circular in cross-section, and there was no evidence of clover-leaf or irregularities or projections at the core-cladding interface.

The ⅜-inch diameter circular clad rod coil was drawn in approximately 5 passes through wire drawing dies in a wire drawing machine to .187-inch diameter. This wire was annealed and then drawn through the dies of a second wire drawing machine in approximately 8 passes to reduce the wire to .064-inch diameter prior to forming into a coil and annealing. After this second annealing, the wire was subjected to approximately 14 passes through the drawing dies of a third machine to reduce the wire to .013-inch diameter, or No. 3 mesh.

This clad screen wire was then woven into wire screen. The wire screen produced had uniform filler spacing, over-all flatness and little tendency to buckle or curl.

Another useful application of the invention is in the production of zinc clad aluminum wire, where the zinc cladding provides a surface useful for subsequent soldering operations on the wire for electrical or other purposes.

The method of the invention can also be applied to the formation of composite rods and wires wherein the core and cladding are formed of any two metals or alloys that can be bonded to each other by hot-holling. Among the other wires that can be produced by the process of the invention are copper-clad aluminum, silver-clad aluminum, and solder-clad aluminum wire for electrical applications where solderability is an important factor; copper-clad steel for structural applications where corrosion resistance is a factor; and gold-clad silver wire for ornamental use.

While present preferred embodiments of the invention have been illustrated and described, it will be understood that the invention is not limited thereto, but may be variously embodied and practiced within the scope of the following claims.

I claim:

1. A method for forming drawable composite metal rod including the steps: extruding a metal billet into an elongated core of polygonal cross section; extruding a metal billet to form a pair of channel members having inner surfaces that mate with the outer surface of said elongated core, said channel members having inner dimensions so proportioned that the channel members will grippingly engage said core, each said channel member having a base and two legs extending therefrom, the sum of the widths of the legs and bases of both said channel members being less than the circumference of said core; assembling said channel members and said core to form a composite rod wherein said channel members grippingly engage a part of the outer surface of said core leaving uncovered gaps of said core between separated juxtaposed edges of said channel members; hot rolling said composite rod by applying rolling pressure to the opposite central portions of said channel members to bond said central portions of said channel members to said core and compress said composite rod until said juxtaposed edges of said channel members are in mutual pressing engagement and said gaps are eliminated and the entire circumferential surface of said core is covered by said channel members; hot-rolling said composite rod by applying rolling pressure ot the juxtaposed edge portions of said channel members to bond said edge portions of said channel members to said core and diminish the cross-sectional area of said composite rod; and, subjecting said composite rod to a plurality of rolling operations wherein different portions of the outer surface of said composite rods are successively and alternately subjected to rolling pressure to produce a rod of diminished cross-sectional area having a core and cladding that are substantially concentric and wherein said core and cladding have substantially-circular cross sections.

2. A method for forming screen wire including the steps: extruding a metal billet into an elongated core of polygonal cross-section; extruding a metal billet to form a pair of channel members having inner surfaces that mate with the outer surface of said elongated core, said channel members having inner dimensions so proportioned that the channel members will grippingly engage said core, each said channel member having a base and two legs extending therefrom, the sum of the widths of the legs and bases of both said channel members being less than the circumference of said core; assembling said channel members and said core to form a composite rod wherein said channel members grippingly engage a part of the outer surface of said core leaving uncovered gaps of said core between separated juxtaposed edges of said channel members; hot rolling said composite rod by applying rolling pressure to the opposite central portions of said channel members to bond metallurgically said central portions of said channel members to said core and compress said composite rod until said juxtaposed edges of said channel members are in mutual pressing engagement and said gaps are eliminated and the entire circumferential surface of said core is covered by said channel members; hot-rolling said composite rod by applying rolling pressure to the juxtaposed edge portions of said channel members to bond metallurgically said edge portions of said channel members to said core and diminish the cross-sectional area of said composite rod; subjecting said composite rod to a plurality of rolling operations wherein different portions of the outer surface of said composite rod are successively and alternately subjected to rolling pressure to produce a rod of diminished cross-sectional area having a core and cladding that are substantially concentric and wherein said core and cladding have substantially-circular cross-sections; and, drawing said rolled composite rod into screen wire.

3. A method for forming drawable composite metal rod including the steps: extruding a high-strength aluminum-containing metal billet into an elongated core of polygonal cross-section; extruding a corrosion-resistant aluminum-containing metal billet to form a pair of channel members having inner surfaces that mate with the outer surfaces of said elongated core, said channel members having inner dimensions so proportioned that the channel members will grippingly engage said core, each said channel member having a base and two legs extending therefrom, the sum of the widths of the legs and bases of both said channel members being less than the circumference of said core; assembling said channel members and said core to form a composite rod wherein said channel members grippingly engage a part of the outer surface of said core leaving uncovered gaps of said core between separated juxtaposed edges of said channel members; hot rolling said composite rod by applying rolling pressure to the opposite central portions of said channel members to bond metallurgically said central portions of said channel members to said core and compress said composite rod until said juxtaposed edges of said channel members are in mutual pressing engagement and said gaps are eliminated and the entire circumferential surface of said core is covered by said channel members; hot-rolling said composite rod by applying rolling pressure to the juxtaposed edge portions of said channel members to bond metallurgically said edge portions of said channel members to said core and diminish the cross-sectional area of said composite rod; and, subjecting said composite rod to a plurality of rolling operations wherein different portions of the outer surface of said composite rod are successively and alternately subjected to rolling pressure to produce a rod of diminished cross-sectional area having a core and cladding that are substantially concentric and wherein said core and cladding have substantially-circular cross sections.

4. A method for forming drawable composite metal rod including the steps: extruding an aluminum-containing metal billet into an elongated core of polygonal cross-section; extruding a zinc billet to form a pair of channel members having inner surfaces that mate with the outer surface of said elongated core, said channel members having inner dimensions so proportioned that the channel members will grippingly engage said core, each said channel member having a base and two legs extending therefrom, the sum of the widths of the legs and bases of both said channel members being less than the circumference of said core; assembling said channel members and said core to form a composite rod wherein said channel members grippingly engage a part of the outer surface of said core leaving uncovered gaps of said core between separated juxtaposed edges of said channel members; hot rolling said composite rod by applying rolling pressure to the opposite central portions of said channel members to bond metallurgically said central portions of said channel members to said core and compress said composite rod until said juxtaposed edges of said channel members are in mutual pressing engagement and said gaps are eliminated and the entire circumferential surface of said core is covered by said channel members; hot-rolling said composite rod by applying rolling pressure to the juxtaposed edge portions of said channel members to bond metallurgically said edge portions of said channel members to said core and diminish the cross-sectional area of said composite rod; and, subjecting said composite rod to a plurality of rolling operations wherein different portions of the outer surface of said composite rod are successively and alternately subjected to rolling pressure to produce a rod of diminished cross-sectional area having a core and cladding that are substantially concentric and wherein said core and cladding have substantially-circular cross sections.

5. A method for forming a drawable composite metal rod including the steps: extruding a metal billet into an elongated core of polygonal cross section; extruding a metal billet to form a pair of channel members having inner surfaces that mate with the outer surface of said elongated core, said channel members having inner dimensions so proportioned that the channel members will grippingly engage said core, each said channel member having a base and two legs extending therefrom, the sum of the widths of the legs and bases of both said channel members being less than the circumference of said core; assembling said channel members and said core to form a composite rod wherein said channel members grippingly engage a part of the outer surface of said core leaving uncovered gaps of said core between separated juxtaposed edges of said channel members; hot rolling said composite rod by applying rolling pressure to the opposite central portions of said channel members to bond metallurgically said central portions of said channel members to said core and compress said composite rod until said juxtaposed edges of said channel members are in mutual pressing engagement and said gaps are eliminated and the entire circumferential surface of said core is covered by said channel members; hot-rolling said composite rod by applying rolling pressure to the juxtaposed edge portions of said channel members to bond metallurgically said edge portions of said channel members to said core and diminish the cross-sectional area of said composite rod; and, subjecting said composite rod to about twelve additional rolling operations wherein different portions of the outer surface of said composite rod are successively and alternately subjected to rolling pressure to produce a rod of diminished cross-sectional area having a core and cladding that are substantially concentric and wherein said core and cladding have substantially-circular cross sections.

6. A method for forming composite aluminum wire screen comprising the steps: extruding a billet of high-strength aluminum alloy to form an elongated core of substantially square cross section; extruding substantially-pure corrosion-resistant aluminum metal to form a pair of U-shaped channel members having inner dimensions mating with the exterior dimensions of said elongated core, each said U-shaped channel member including a base and two legs; the inner width of said base being substantially equal to the width of said elongated core, the inner width of each said leg of said U-shaped channel member being somewhat less than one-half the thickness of said elongated core; assembling said U-shaped channel members with opposite faces of said core to form a composite rod wherein the bases of each said U-shaped channel member engage opposite faces of said core and said channel legs of each said channel member tightly engage opposite faces of said core, the juxtaposed legs of opposite channel members forming gaps therebetween; hot-rolling said composite rod by applying rolling pressure to said opposite bases of said U-shaped channel members to bond said bases to the surface of said core and compress said composite rod until said juxtaposed ends of opposite channel members are in pressing engagement and said gaps are eliminated and the entire circumferential surface of said core is covered by said two channel members; hot-rolling said composite rod by applying pressure to said legs of said channel members to bond said channel legs to the surface of said core and diminish the cross-sectional area of said composite rod; subjecting said composite rod to a plurality of rolling operations wherein different portions of the outer surface of said composite rod are successively and alternately subjected to rolling pressure to produce a rod of diminished cross-sectional area having a core and cladding that are substantially-concentric and wherein said core and cladding have substantially-circular cross sections; drawing said rod into wire; and, weaving said wire into screen.

7. A method for forming composite screen wire including the steps: extruding a billet of high-strength aluminum-containing alloy into an elongated core of substantially-square cross section having a width of about 2 inches; extruding a billet of substantially-pure corrosion-resistant aluminum into a pair of U-shaped channel members having inner dimensions mating with the exterior dimensions of said elongated core, each said U-shaped channel member including a base and two legs, the inner width of said base being about 2 inches, the inner width of said legs being about ¾-inch; assembling said U-shaped channel members with opposite faces of said core to form a composite rod wherein the bases of said U-shaped channel members engage opposite faces of said core and said channel legs of each said channel member tightly engage opposite faces of said core, the juxtaposed legs of opposite channel members forming gaps therebetween; hot-rolling said composite rod by applying rolling pressure to said opposite bases of said U-shaped channel members to bond said bases to the surface of said core and compress said composite rod until said juxtaposed edges of said opposite channel members are in mutual pressing engagement and said gaps are eliminated and the entire circumferential surface of said core is covered by said channel members; hot-rolling said composite rod by applying rolling pressure to said legs of said channel members to bond said channel legs to the surface of said core and diminish the cross-sectional area of said composite rod; subjecting said composite rod to not more than about ten additional rolling operations wherein different portions of the outer surface of said composite rod are successively and alternately subjected to rolling pressure to produce a rod of about ⅜-inch overall diameter and having a core and cladding that are substantially-concentric and wherein said core and cladding have substantially-circular cross sections; and, drawing said rod into wire having a diameter of about 0.013 inch.

8. A method for forming composite metal rod including the steps: assembling a pair of channel members around a core to form a composite rod wherein said channel members engage a part of the outer surface of said core leaving uncovered gaps of said core between separated opposed edges of said channel members; hot rolling said composite rod by applying rolling pressure to the opposite central portions of said channel members to bond said central portions of said channel members to said core and compress said composite rod until said opposed edges of said channel members are in mutual pressing engagement and said gaps are eliminated and the entire circumferential surface of said core is covered by said channel members; and, rolling said composite rod further to bond the edge portions of said channel members to said core and diminish the cross-sectional area of said composite rod.

9. A method for forming composite metal rod including the steps; extruding an elongated metal core; extruding a pair of channel members having their concave surfaces shaped to engage opposite portions of said core; assembling said pair of channel members around said core to form a composite rod wherein said channel members engage a part of the outer surface of said core leaving uncovered gaps of said core between separated opposed edges of said channel members; hot rolling said composite rod by applying rolling pressure to the opposite central portions of said channel members to bond said central portions of said channel members to said core and compress said composite rod until said adjacent edges of said channel members are in mutual pressing engagement and said gaps are eliminated and the entire circumferential surface of said core is covered by said two channel members; and, rolling said composite rod further to bond said edge portions of said channel members to said core and diminish the cross-sectional area of said composite rod.

10. A method of forming composite metal rod including the steps: assembling a pair of metal channel members around a metal core to form a composite rod wherein said channel members engage a part of the outer surface of said core leaving uncovered gaps of said core between separated opposed edges of said channel members; hot rolling said composite rod by applying rolling pressure to the opposite central portions of said channel members to bond metallurgically said central portions of said channel members to said core and compress said composite rod until said opposed edges of said channel members are in mutual pressing engagement and said gaps are eliminated and the entire circumferential surface of said core is covered by said channel members; and, further rolling said composite rod to bond metallurgically the edge portions of said channel members to said core and diminish the cross-sectional area of said composite rod.

11. A method for forming composite metal rod including the steps: assembling a pair of corrosion-resistant aluminum-containing channel members around a high-strength aluminum-containing core to form a composite rod wherein said channel members engage a part of the outer surface of said core leaving uncovered gaps of said core between separated opposed edges of said channel members; heating said composite rod to about 800 degrees Fahrenheit; hot-rolling said heated composite rod by applying rolling pressure to the opposite central portions of said channel members to bond metallurgically said central portions of said channel members to said core and compress said composite rod until said opposed edges of said channel members are in mutual pressing engagement and said gaps are eliminated and the entire circumferential surface of said core is covered by said channel members; further hot rolling said composite rod by applying rolling pressure to the edge portions of said channel members to bond metallurgically edge portions of said channel members to said core; and, further rolling said composite rod to diminish the cross-sectional area of said composite rod.

References Cited in the file of this patent

UNITED STATES PATENTS

| | | |
|---|---|---|
| 246,407 | McTighe | Aug. 30, 1881 |
| 2,063,470 | Staples | Dec. 8, 1936 |
| 2,258,563 | Armstrong et al. | Oct. 7, 1941 |
| 2,383,511 | Reynolds | Aug. 28, 1945 |

FOREIGN PATENTS

| | | |
|---|---|---|
| 485,801 | Germany | Nov. 6, 1929 |
| 809,812 | Great Britain | Mar. 4, 1959 |